United States Patent [19]

Usami et al.

[11] Patent Number: 4,811,838
[45] Date of Patent: Mar. 14, 1989

[54] PLATE-LIKE CONTAINER FOR CONTAINING JELLIED TWO PARTS COMPONENTS

[75] Inventors: Ikuzo Usami; Yoshinori Sato; Yoshitaka Kurosawa; Kazuyuki Morimura, all of Hachioji, Japan

[73] Assignee: Three Bond Co., Ltd., Tokyo, Japan

[21] Appl. No.: 219,315

[22] Filed: Jul. 15, 1988

Related U.S. Application Data

[62] Division of Ser. No. 36,238, Apr. 9, 1987.

[30] Foreign Application Priority Data

Mar. 2, 1987 [JP] Japan ................... 62-30300
Mar. 11, 1987 [JP] Japan ................... 62-35373
Apr. 15, 1987 [JP] Japan ................... 61-86857

[51] Int. Cl.$^4$ .............................................. B65D 25/08
[52] U.S. Cl. ................................................... 206/219
[58] Field of Search ............................ 206/219, 222

[56] References Cited

U.S. PATENT DOCUMENTS

| | | | |
|---|---|---|---|
| 4,153,156 | 5/1979 | Seemann et al. ............... | 206/219 |
| 4,477,208 | 10/1984 | Scott ............................... | 206/219 |
| 4,519,499 | 5/1985 | Stone et al. .................... | 206/219 |
| 4,524,078 | 6/1985 | Bardsley et al. ............... | 206/219 |

Primary Examiner—Joseph Man-Fu Moy
Attorney, Agent, or Firm—Martin A. Farber

[57] ABSTRACT

A plate-like container is for containing a two part composition consisting of two components with the components isolated in such a manner that they are not mixed with each other. The two components are preserved in an isolated relation to each other prior to use, and if intended to be used, they are mixed together and then placed into service. The components are jellied by addition of a viscosity modified thereinto.

3 Claims, 1 Drawing Sheet

(PRIOR ART)

PLATE-LIKE CONTAINER FOR CONTAINING JELLIED TWO PARTS COMPONENTS

RELATED APPLICATIONS

This application is a divisional application of our copending application, Ser. No. 036,238, filed Apr. 9, 1987.

BACKGROUND OF THE INVENTION

1. Field of the Invention

The present invention relates to a plate-like container for containing a two part composition consisting of two components in a container with two components isolated in such a manner that they are not mixed with each other, the two components being preserved in an isolated relation to each other prior to use, and if intended to be used, the components being mixed together and then placed into service, and particularly, to a plate-like container for containing a two part composition consisting of two components which are easy to isolate and can be easily mixed as desired to be used.

2. Description of the Prior Art

Adhesives, sealants, coatings, casting materials, etc., are principally placed into service by mixing a primary component such as epoxy, unsaturated polyester, vinyl ester, polyurethane, silicone and polymercapto resins with a curing agent (catalyst) as a secondary component and then causing a curing phenomenon in the resulting mixture to occur by a chemical reaction and cure it. Such two part compositions are preserved with individual components separately isolated prior to use and when the two part composition is to be used, these components are mixed and placed into service. Such two part composition should be preserved with individual components separately isolated in such a manner that they are not mixed with each other.

It is conventionally known to use a container as shown in FIG. 3(a) and (b) in containing such a type of two part compositions. As apparent from FIG. 3(a), the container 1 is constructed with its interior divided into a space 3 and spaces 4 by isolating walls 2. For example, a primary component such as an epoxy resin is filled into the space 3, and a curing agent is filled into the spaces 4. Then, a cover layer 5 is mounted on the top of the container by heat sealing. In this way, the primary component and the curing agent are contained in the container in a separately isolated relation. When such two part composition is intended to be used, the cover layer 5 is stripped and then, the section of the space 3 is depressed down to deform the container 1 as shown in FIG. 3 (b) to mix the primary component with the curing agent.

With this type of container, however, various disadvantages are encountered: It is not easy to depress down the section of the space 3 and in addition, in view of materials, a special flexible material must be selected. Moreover, only a relatively small volume of components may be filled.

Alternatively, a method has been adopted for containing and preserving two components in separate containers, wherein when these components are desired to be used, they are mixed. With this method, however, there is required an operation for transferring the contained components when they are to be mixed, resulting in a longer time. Additionally, it is feared that the liquid remaining causes a failure of curing or the like.

OBJECT OF THE INVENTION

It is therefore an object of the present invention to provide a plate-like container for containing a two part composition, wherein two individual components are easy to isolate and can be readily mixed when intended to be used, and wherein the disadvatages found in the above known prior art are overcome.

SUMMARY OF THE INVENTION

According to the present invention, the above object is accomplished by providing a plate-like container for containing jellied two part components, wherein a plurality of depressions are provided in a surface of the container, and the jellied components of the two part composition are contained in the opposite corners of the depression in a spaced apart relation to each other, with the respective surfaces of the components being inclined from an inner rising surface of the depression to a bottom surface, and in use, the components being mixed within the depressions and placed into service in the form of a mixture.

The above and other objects, features and advantages of the invention will become apparent from reading of the following detailed description taken in conjunction with the accompanying drawings.

DETAILED DESCRIPTION OF THE INVENTION

The above-described two part composition, which are preserved with the individual components isolated prior to use and when intended to be used, are placed into service with such individual components mixed with each other, consist of two components, for example, a primary component such as an adhesive, a sealant, a coating and a casting material and a curing agent as a secondary component. Illustrative of the primary components are epoxy, unsaturated polyester, acrylic, silicone, polyurethane, polymercapto resins, etc.

The viscosity modifiers which may be used include those commercially available, and specific examples of them are benzylidenesorbitol, lauroylglutamic dibutylamide, organobentonites, asbestos powders, silica powders, hydrogenated caster oils, etc. The amount of viscosity modifier added may be of any level depending upon the type of components and viscosities, but should be in a range sufficient to provide a viscosity, i.e., a jellied condition sufficient so that the viscosity modifier cannot be mixed with the other liquid component.

EXAMPLE

The present invention will now be described in more detail by way of Example.

EXAMPLE 1

A two part composition which was used comprised a primary component (liquid A) (Epicoat #828, bisphenol type epoxy resin available from Yuka shell Co., Ltd.) and a curing agent (modified alicyclic polyamine available from Three Bond Co., Ltd.), with a viscosity modifier of Coregulane GP (laurylglutamic dibutylamide available from Ajinomoto Co., Ltd.) being added to each of the primary component and the curing agent in an amount of 5 parts by weight per 100 parts by weight thereof to jelly them.

Figure 1:
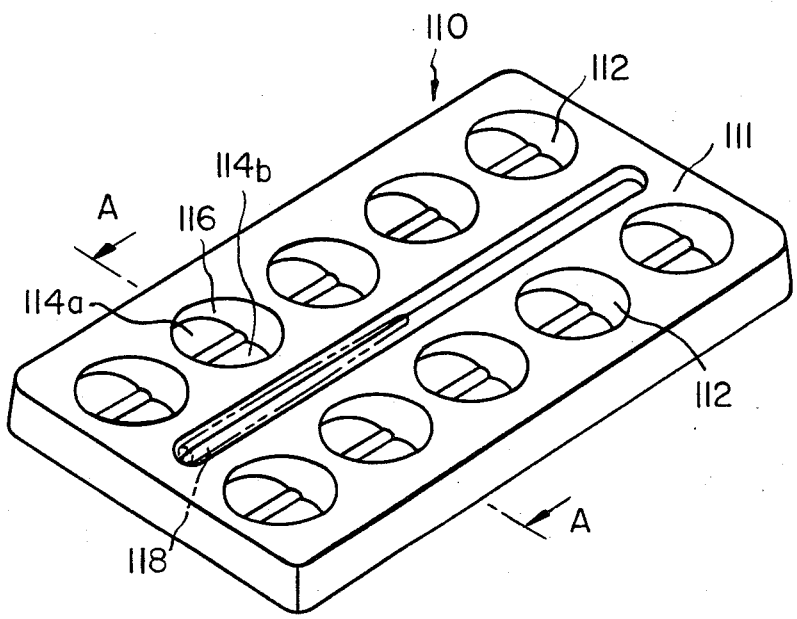
FIG. 1 is an embodiment of a plate-like of container of the present invention.
Figure 2:
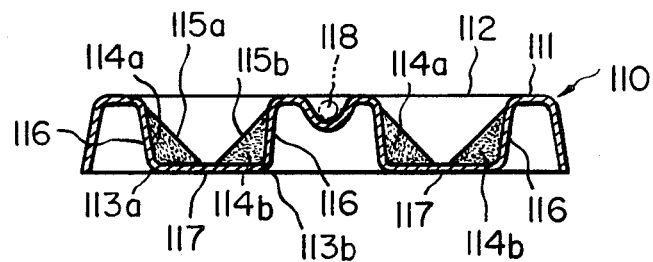
FIG. 2 is a sectional view taken along a line A—A of FIG. 1.
Figure 3A:
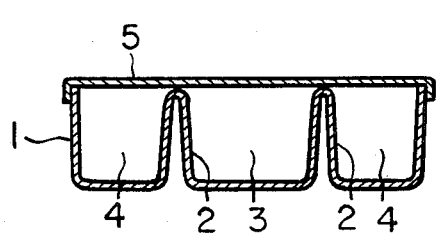
FIGS. 3(a), 3(b) are a sectional view illustrating the prior art method for containing a two part composition in the known container, FIG. 3 (a) illustrating two components isolated and FIG. 3(b) illustrating the two components mixed.
Figure 3B:
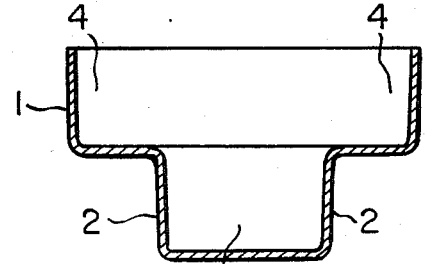

The above two part composition was contained in a container shown in FIG. 1. FIG. 1 is a perspective view of an embodiment of a container for use in the present invention, and FIG. 2 is a sectional view taken along a line A—A of FIG. 1, wherein the reference numeral 110 designates a plate-like container for use in the present invention. A plurality of depressions 112 are provided in a surface 111 of the container 110. Each depression 112 is defined as substantially cylindrically extending down from the surface 111, as shown in FIG. 1, but the shape thereof is optional. Jellied components 114a and 114b of the two part composition are contained in the opposite corners 113a and 113b of each depression 112 in a spaced apart relation to each other, with the respective surfaces 115a and 115b of the components 114a and 114b being inclined from an inner rising surface 116 of the depression 112 to a bottom surface 117, as shown in FIG. 2.

The filling of the two components into the plate-like container 110 was conducted in the following manner: First, the viscosity modifier was added to the primary component as well as the curing agent at a temperature of 110° to 120° C. and melted. While being hot and fluid, at first, the curing agent is allowed to obliquely flow into the corner 113a of the depression 112 shown FIG. 1 and then, it is cooled and jellied (component 114a). Then, the primary is likewise allowed to flow into the corner 113b of the depression 112 and then, it is cooled and solidified.

The resulting container was found to be easy and complete to isolate the two components and also easy to mix them in use. More specifically, as shown in FIG. 1, the two components are contained in the corners 113a and 113b of the depression 112 in jellied conditions and in a spaced apart relation to each other, so that they cannot contact with each other during preservation. Particularly, since the two components 114a and 114b are contained with their surfaces 115a and 115b inclined, they are stable and free from care of destruction during preservation. Accordingly, the individual components 114a and 114b are easily and completely isolated. In use, the components 114a and 114b are mixed within the depression 112 by a stirring rod 118 and placed into service in the form of a mixture.

Thus, with the above container, the two components cannot react to cure, because they have been themselves jellied and moreover contained in the opposite corners in a spaced apart relation to each other with their surfaces inclined. In use, merely stirring the two components 114a and 114b in the depressions 112 by the stirring rod 118 enables them to be mixed and used. Accordingly, the containers in accordance with the present invention are easy and complete to isolate the two components and also easy to mix them in use.

What is claimed is:

1. A plate-like container for containing and in combination with jellied two part components of a two part composition wherein a plurality of depressions are provided in a surface of the container, and both of the jellied two part components of the two part composition are contained in opposite corners of at least one of the same said depressions in a spaced apart relation to each other, with the respective surfaces of the components being inclined from an inner rising surface of the corresponding depression to a bottom surface, and in use, the components being mixable within the depression and placed into service in the form of a mixture.

2. A plate-like container for containing jellied two-part components according to claim 1, wherein the jellied components are jellied with a viscosity modifier.

3. A plate-like container for containing jellied two-part components according to claim 2, wherein said viscosity modifier is selected from the group consisting of benzylidenesorbitol, lauroylglutamic dibutylamide, organobentonites, asbestos powders, silica powders and hydrogenated caster oils.

* * * * *